US011416631B2

(12) United States Patent
Sofer et al.

(10) Patent No.: US 11,416,631 B2
(45) Date of Patent: Aug. 16, 2022

(54) DYNAMIC MONITORING OF MOVEMENT OF DATA

(71) Applicant: International Business Machines Corporation, Armonk, NY (US)

(72) Inventors: Oded Sofer, Midreshet Ben Gurion (IL); Guy Galil, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 111 days.

(21) Appl. No.: 16/985,422

(22) Filed: Aug. 5, 2020

(65) Prior Publication Data

US 2022/0043927 A1 Feb. 10, 2022

(51) Int. Cl.
| | |
|---|---|
| *G06F 21/62* | (2013.01) |
| *G06F 21/55* | (2013.01) |
| *G06F 16/22* | (2019.01) |
| *G06F 16/901* | (2019.01) |

(52) U.S. Cl.
CPC ...... *G06F 21/6218* (2013.01); *G06F 16/2282* (2019.01); *G06F 16/9024* (2019.01); *G06F 21/556* (2013.01)

(58) Field of Classification Search
CPC ............ G06F 21/6218; G06F 16/2282; G06F 16/9024; G06F 21/556; G06F 21/62; G06F 21/55; G06F 16/22; G06F 16/901
See application file for complete search history.

(56) References Cited

U.S. PATENT DOCUMENTS

| | | | |
|---|---|---|---|
| 7,827,608 B2 | 11/2010 | Bird et al. | |
| 9,852,294 B1 * | 12/2017 | Zhu | ........................ G06F 21/562 |
| 2019/0228186 A1 * | 7/2019 | Atreya | .................... G06F 21/10 |

FOREIGN PATENT DOCUMENTS

CN 104778419 A 7/2015

OTHER PUBLICATIONS

Peter Mell and Timothy Grance; The NIST Definition of Cloud Computing, Special Publication 800-145, Sep. 2011.
Mark Wah; Data Activity Monitoring and Data Loss Prevention: A Balanced Approach to Securing Your Critical Assets, Jul. 31, 2015, https://securityintelligence.com/data-activity-monitoring-and-data-loss-prevention-a-balanced-approach-to-securing-your-critical-assets.
Walter Chang et al; Efficient and Extensible Security Enforcement Using Dynamic Data Flow Analysis, Oct. 31, 2008.
Long Cheng et al; Enterprise data breach: causes, challenges, prevention, and future directions, 2017, WIREs Data Mining and Knowledge Discovery, published by John Wiley & Sons, Ltd.
Data loss prevention Keeping your sensitive data out of the public domain, Oct. 2011.

* cited by examiner

*Primary Examiner* — Quazi Farooqui
(74) *Attorney, Agent, or Firm* — David B. Woycechowsky

(57) ABSTRACT

A computer-based system and method for monitoring of movement of data in a computer network, including: parsing a message, the message including one of a data access command sent to a computer database and a response to a data access command, to extract a template, metadata and data of the data access command, examining the template, metadata and data of the message to identify messages related to movement of data that is classified as sensitive, and generating a flow graph indicative of new locations of the sensitive data. Policy rules may be applied to the new locations of the sensitive data to monitor access to the new location.

16 Claims, 7 Drawing Sheets

DYNAMIC MONITORING OF MOVEMENT OF DATA

FIELD OF THE INVENTION

The present invention relates generally to dynamic monitoring of movement of data, and specifically, to identifying movements of sensitive data dynamically.

BACKGROUND

Protecting sensitive data is critical for data protection and for meeting regulation requirements (e.g. general data protection regulation (GDPR), the California consumer privacy act (CCPA), the health insurance portability and accountability act (HIPAA), payment card industry data security standard (PCI DSS), Sarbanes-Oxley Act (SOX), Iso27000, etc.). A data protection and monitoring system, for example the Guardium® system, may provide data activity monitoring and discovery of unusual activity around sensitive data. The data protection and monitoring system may protect against unauthorized data access by learning regular user access patterns and can provide alerts on suspicious activities.

The data protection and monitoring system may typically capture or sniff data accesses to a database (e.g., requests and responses) in real-time and analyze the data according to policy rules to identify sensitive data. The data protection and monitoring system may include a data activity monitor (DAM) and/or file activity monitor (FAM). The requests and responses sniffed by the data protection and monitoring system may include data packets that may include a data access command, also referred to as query, e.g., a structured query language (SQL) statements, or a response, and associated header information. The header may include parameters such as machine information, network information, user information, client information, etc.

The data protection and monitoring system may rely on policies to determine what data access to track, alert on and even block. Such policies may use predetermined lists of repositories (e.g., data sources) and objects (e.g., collections and tables) that are categorized as including sensitive data and therefore need protection, e.g., special handling. However, in prior art systems, when sensitive data is copied or moved from monitored repositories or objects to unknown, un-monitored repositories, the copied data is no longer marked as sensitive and the measures that are normally taken to protect sensitive data are not performed.

SUMMARY

According to embodiments of the invention, a system and method for monitoring of movement of data in a computer network may include: parsing a message, the message including one of a data access command sent to a computer database and a response to a data access command, to extract at least one of a template, metadata and data of the message; examining at least one of the template, metadata and data of the message to identify messages related to movement of data that is classified as sensitive; and generating a flow graph indicative of new locations of the sensitive data.

Embodiments of the invention may further include applying policy rules to the new locations of the sensitive data to monitor access to the new location.

Embodiments of the invention may further include using the flow graph to detect a data leak through multiple movements of the data.

According to embodiments of the invention, examining the metadata may include identifying a source and a target for the movement of the data, wherein the target is the new location of the sensitive data.

According to embodiments of the invention, examining the data and metadata may include: checking if the message includes known types or categories of sensitive data.

According to embodiments of the invention, examining the template, data and metadata may include performing one or more of: wildcard search, regular expression search, dictionary search, rule match search, fuzzy search, and natural language processing.

Embodiments of the invention may further include maintaining a dictionary of data, metadata and templates associated with sensitive data, wherein examining the template, metadata and data of the message may include matching the templates, data and metadata in the message to the templates, data and metadata in the dictionary.

Embodiments of the invention may further include ordering the dictionary by frequency of identification of terms in the messages related to movement of data that is classified as sensitive; associating an importance level to each item in the dictionary, wherein the importance level is inversely related to the frequency of identification; and removing from the dictionary templates, data and metadata and with importance level below a threshold.

According to embodiments of the invention, examining the data access command may include identifying in the data access command a template that is associated with movement of data, and identifying in the data access command data or metadata that is associated with sensitive data.

According to embodiments of the invention, a system and method for monitoring movement of data in a computer database, may include: parsing data access commands sent to the computer database and responses to a data access commands, to extract a template, metadata and data: examining the template, metadata and data to identify data access commands and responses related to movement of sensitive data; and applying policy rules to the new locations of the sensitive data to monitor access to the new location.

Embodiments of the invention may further include generating a flow graph indicative of new locations of the sensitive data.

BRIEF DESCRIPTION OF THE DRAWINGS

The subject matter regarded as the invention is particularly pointed out and distinctly claimed in the concluding portion of the specification. Embodiments of the invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
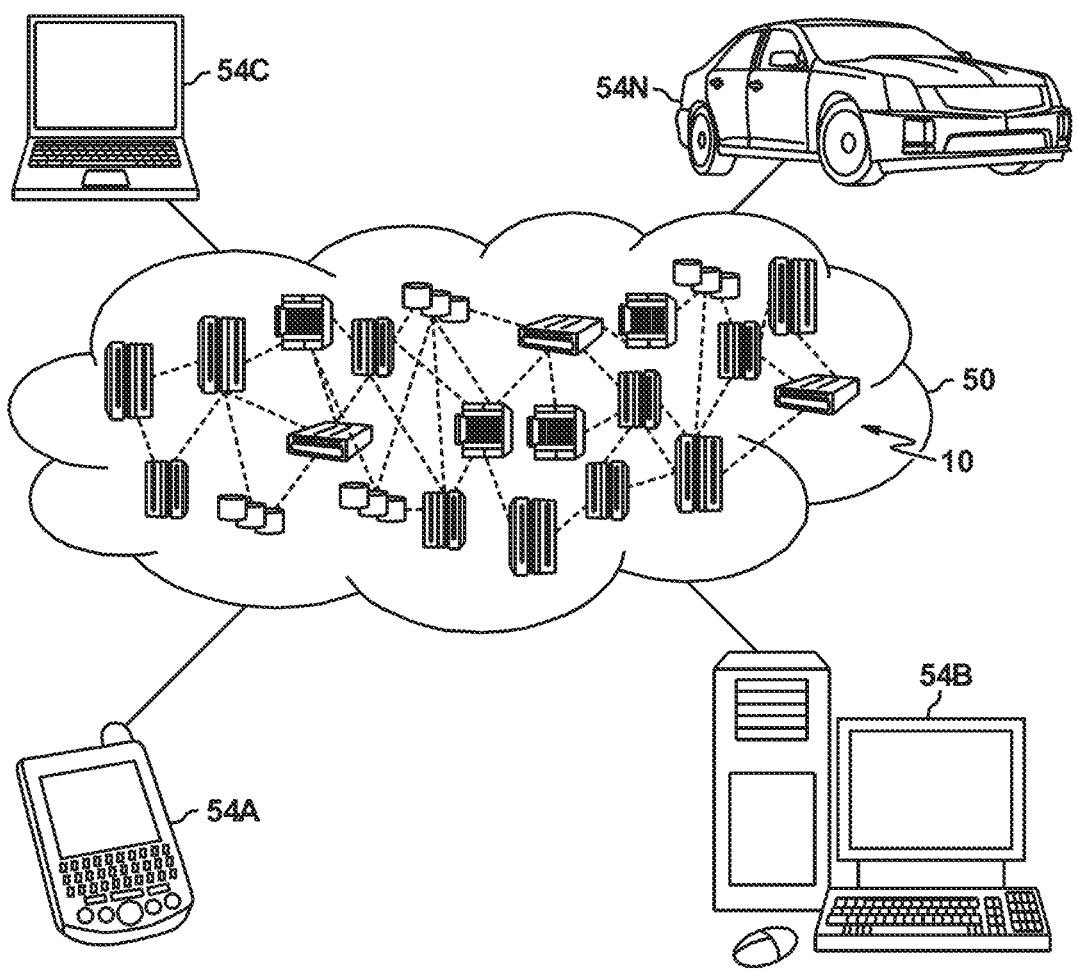
FIG. 1 depicts a cloud computing environment according to an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although some embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device that manipulates and/or transforms data represented as physical (e.g., electronic) quantities within the computer's registers and/or memories into other data similarly represented as physical quantities within the computer's registers and/or memories or other information transitory or non-transitory or processor-readable storage medium that may store instructions, which when executed by the processor, cause the processor to execute operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items unless otherwise stated. Unless explicitly stated, the method embodiments described herein are not constrained to a particular order or sequence. Additionally, some of the described method embodiments or elements thereof can occur or be performed in a different order from that described, simultaneously, at the same point in time, or concurrently.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. An example cloud model includes for example five characteristics, at least three service models, and at least four deployment models.

Characteristics may be for example:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models may be for example:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Database-as-a-Service (DBaaS): the capability provided to the consumer is to store data on a cloud infrastructure. DBaaS paradigm is a common approach for storing data in a cloud based computerized service, where users get access to data without the need for managing hardware or software.

Deployment Models may be for example:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Embodiments of the invention may provide a system and method to dynamic monitoring of movement of data, and specifically, to identifying movements of sensitive data in a computer system or network.

A database may include organized data stored in a computerized system. Data items in a database may be arranged at least logically as an array or a table of rows and columns (other types of organization may be used). Typically, a row in a database relates to a single entity and each column in the database stores an attribute associated with the entity. A column, sometimes referred to as subsection, includes data items that pertain to a single data category, also referred to as data type. A data category may include a distinct class to which data items belong. Data categories may include name, address, ID number, employee numbers rank, credit card number, etc. All data within a column or a data category typically has the same format (e.g. alphabetical, numeric, number, date, selection among a set of categories, etc.) and describes the same substantive attribute of the entity corresponding to a specific data item within the data having the same category. Data items may be alphabetical, alphanumeric, numerical, or other standard formats.

In many applications, each column in a database may have or include metadata, or a column header, associated with the data in the column. Metadata may be data identifying a table (e.g., table name) and/or a data category or column (e.g., column header) in a database. Ideally, the metadata may include meaningful data describing characteristics of the data or data category without describing the specific entry for a specific data item. For example, meaningful metadata for a date category may include "date" while the data itself, described by the metadata, may be Feb. 3, 1975.

Some of the data categories may be defined as sensitive data and some may not. For example, credit card numbers may be defined as sensitive data, while a number of television screens owned by a family may not. The definition of data category as sensitive may be internal to an organization or imposed on the organization by data protection laws and regulations.

Current architecture of DAM and FAM products is based on a two steps process. The first step is performed in real-time by an agent software or application which is installed on the data source machine and the second step is performed offline by a security server application, also referred to as a collector. The data source machine may include a database, e.g., a database server, a file server, etc., or a combination of a database and a proxy or network gate of the database. The agent software may be installed on the database itself or on the proxy or network gate of the database. Installing the agent software on a proxy or network gate of a database may enable capturing data packets in cloud-based databases (when DBaaS model is used) that are many times operated by a third party that does not allow installation of software applications on its databases.

Typical DAM and FAM products may monitor access to sensitive data in the monitored database. For example, DAM and FAM products may include an agent application and a collector application. Users of the database may access the database by sending data access commands, e.g., SQL statements. The database may issue a response to the data access commands. The agent application may monitor access to sensitive data by capturing all the data packets of the data access commands and responses of the monitored database, reading the header information, performing an initial rule processing on the header information, and sending the data packet to the collector application for an offline comprehensive security analysis. The comprehensive security analysis performed by the collector may include getting the data packet from the agent, parsing the data packet, structuring the data, e.g., classifying the data and mapping the metadata to the data, building the data hierarchy, applying the policy rules on the classified data to identify sensitive data and detecting a data breach or data tampering, according to the rules matching. Thereafter, the collector may send the data for further analysis and auditing by other components.

Typical DAM and FAM products rely on policies to determine what data access to track, alert on and even block. Such policies may use predetermined lists of repositories (e.g., data sources) and objects (e.g., collections and tables) that are categorized as including sensitive data and therefore need protection, e.g., special handling. Thus, as long as the sensitive data is categorized as such, the sensitive data is monitored and special measures may be taken to protect the data and prevent data leakage. However, in prior art systems, when sensitive data is copied or moved from monitored repositories or objects to unknown, un-monitored repositories, the copied data is no longer marked as sensitive and the measures that are normally taken to protect sensitive data are not performed. Thus, the sensitive data is no longer protected and may leak out of the organization. For example, the sensitive data may be moved out of the organization.

Embodiments of the invention may provide a system and method for extending the coverage of security system to new locations (e.g., tables, repositories or objects) of sensitive data. Embodiments of the invention may enable tracking of data flow or movement from monitored locations to un-monitored locations and adjusting the security policies accordingly. Thus, embodiments of the invention may improve the technology of data security by monitoring sensitive data that have been moved to a new location.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. Cloud computing environment is typically located remotely from its users. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

According to embodiments of the invention, the cloud consumers may include a data owner and the data client. For example, a data owner may store data in cloud computing environment 50 and a data client may retrieve data from cloud computing environment 50 using any of personal digital assistant (PDA) or cellular telephone 54A, desktop computer 54B, laptop computer 54C, automobile computer system 54N and/or any other type of computerized device.

Figure 2:
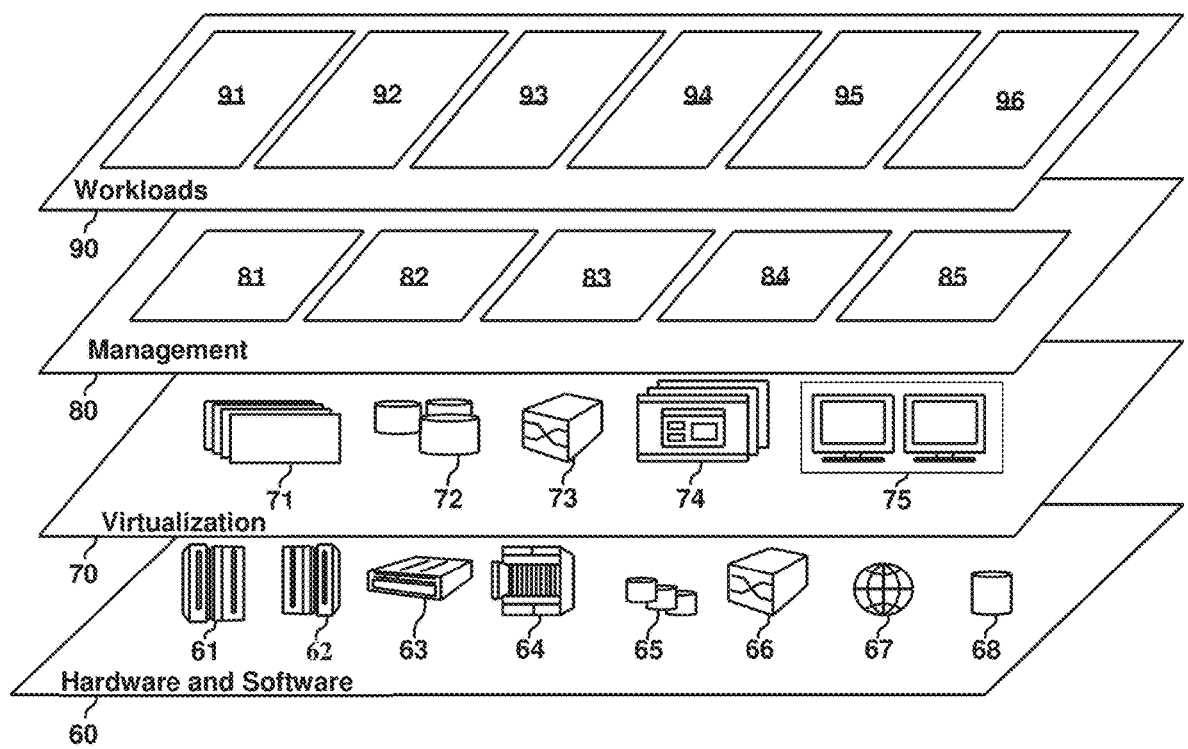
FIG. 2 depicts abstraction model layers according to an embodiment of the present invention.
Figure 7:
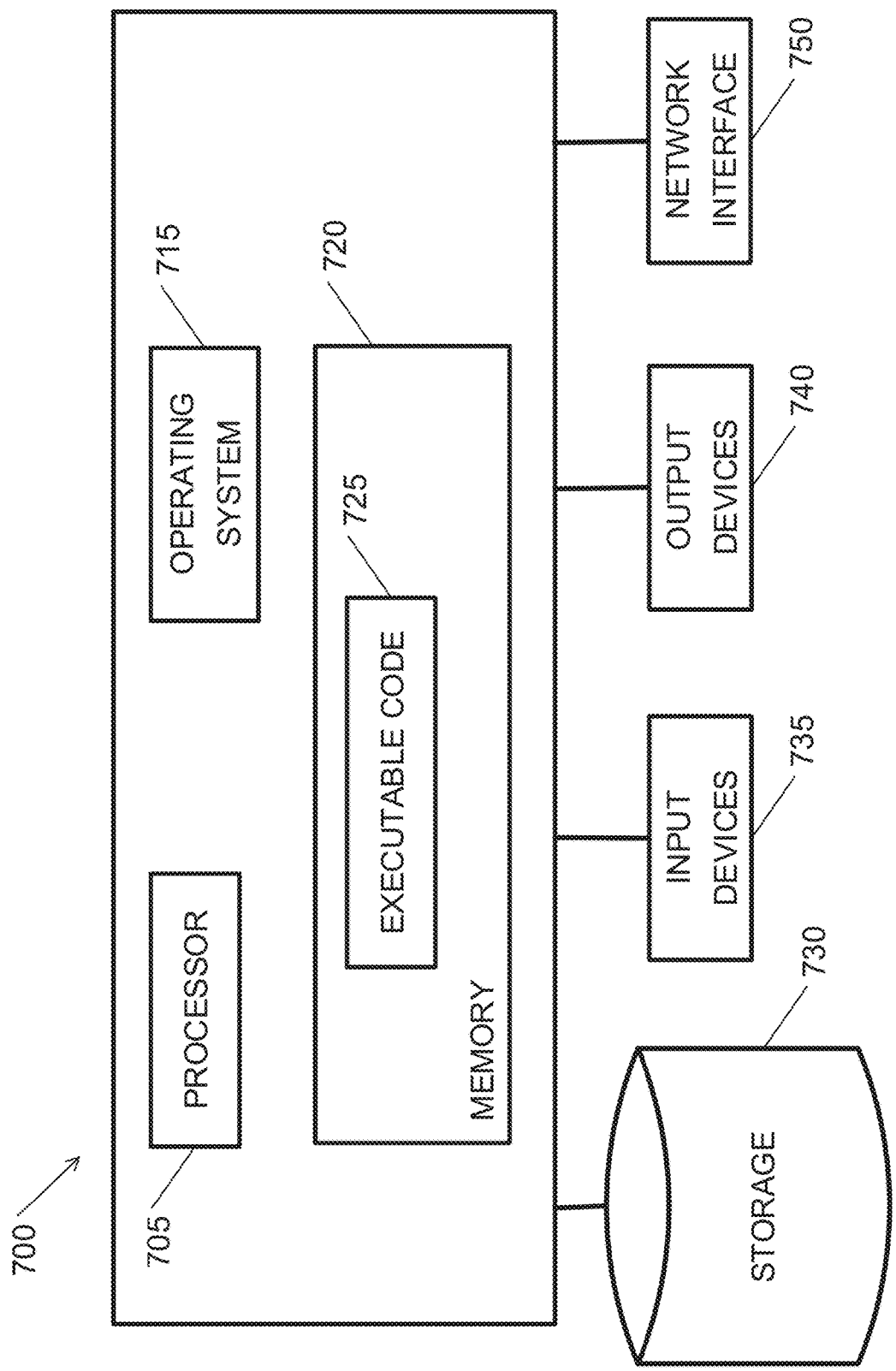
FIG. 7 illustrates an example computing device according to an embodiment of the invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components, such as the hardware and software components depicted in FIG. 7. Examples of hardware components include: processors (e.g., processor 705 depicted in FIG. 7) such as mainframes 61, RISC (Reduced Instruction Set Computer) architecture based servers 62, servers 63 and blade servers 64; storage devices 65 (e.g., storage device 730 depicted in FIG. 7); and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

According to some embodiments, a monitored database may be implemented on virtual storage 72 and physically located on storage devices 65. The database may be managed by database software 68 that may include an agent software according to embodiments of the invention. A collector or a data security application may be implemented by software running on a virtual server 71. However, other architecture and hardware may be used.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95.

Figure 3:
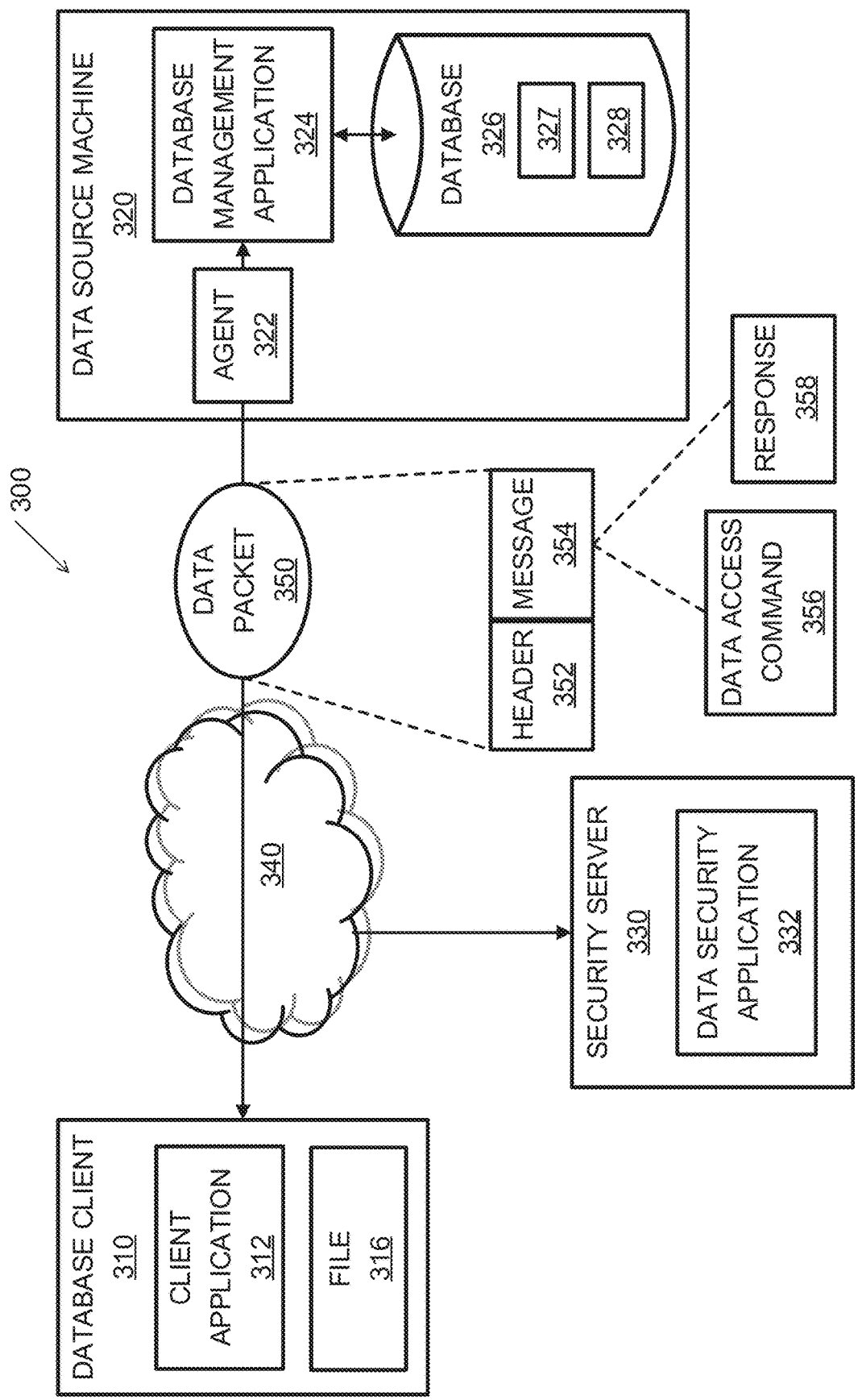
FIG. 3 depicts a computer network, according to embodiments of the invention.

Reference is made to FIG. 3, depicting a computer network or system 300, according to embodiment of the invention. According to some embodiments, security server 330 may be implemented on a virtual server 71 and data source machine 320 may be implemented on virtual storage 72, however, other implementations may apply. It should be understood in advance that the components, and functions shown in FIG. 3 are intended to be illustrative only and embodiments of the invention are not limited thereto.

Networks 340 may include any type of network or combination of networks available for supporting communication between database client 310 data source machine 320 and security server 330. Networks 340 may include for example, a wired, wireless, fiber optic, or any other type of connection, a local area network (LAN), a wide area network (WAN), the Internet and intranet networks, etc. Additionally or alternatively, any of database client 310 data source machine 320 and security server 330 may be connected to each other directly.

According to some embodiments, a database client application 312 running on database client 310 may communicate with data source machine 320, for example, by generating and submitting data packets or data records 350 including for example data access commands or database queries to data source machine 320.

In one example, data packet 350 may include a header 352 and a message 354. Header 352 may include parameters such as machine information, network information, user information, client information, etc. For example, header 352 may include the following parameters: ServerHostName, ServiceName, DbName, ClientHost, OsUser, DbUser, etc. Message 354 may include a data access command 356 sent from database client application 312 to data source machine 320 or a response 358 to the data access command sent from data source machine 320 to database client application 312. Data access command 356 may include database query or command, e.g., an SQL statement. Response 358 may include data retrieved form data source machine 320 in response to data access command 356. Typically, data access command 356 may include a template, metadata and data. The template may include language (e.g., SQL) key words that specify the required action, e.g., create table, insert select, dump to file etc., metadata may identify a table or a column in the database, e.g., table name, column header, etc., and data may refer to specific values that are included in data access command 356 or provided from data source machine 320 in response 358. Response 358 may include metadata and data or values. An example for data access command 356 may include "Select Field1 from EMP_SAL where AMOUNT>1000". In this example "select", "from" and "where" are the template, "EMP_SAL", the table name, and "AMOUNT", the column header are metadata and "1000" is a value. A response 358 to this data access command 356 may include an array of both metadata (e.g., column names) and data or values.

While a single database client 310 and a single data source machine 320 are shown in FIG. 3, one or more data source machines 320 may provide database services to one or more database clients 310 or client applications 312.

In one example, message 354 of data packet 350 may include a query or data access command 356 (e.g., a request or an SQL statement) or a response 358 to data access command 356. Data access command 356 may include a structured query language (SQL) statement, for accessing data in tables managed by the database management application (e.g., database management application 324, and/or database software 68). SQL represents a standardized language for defining and manipulating data in a relational database 326. For example, under a relational database model, database 326 may be perceived as a set of tables that include data, and data may be retrieved by using SQL statements to specify a result table that can be derived from one or more tables. Data access command 356 may be defined in one or more additional or alternate languages or protocols for defining and manipulating data in a relational database 326 or in other types of databases.

Figure 4B:
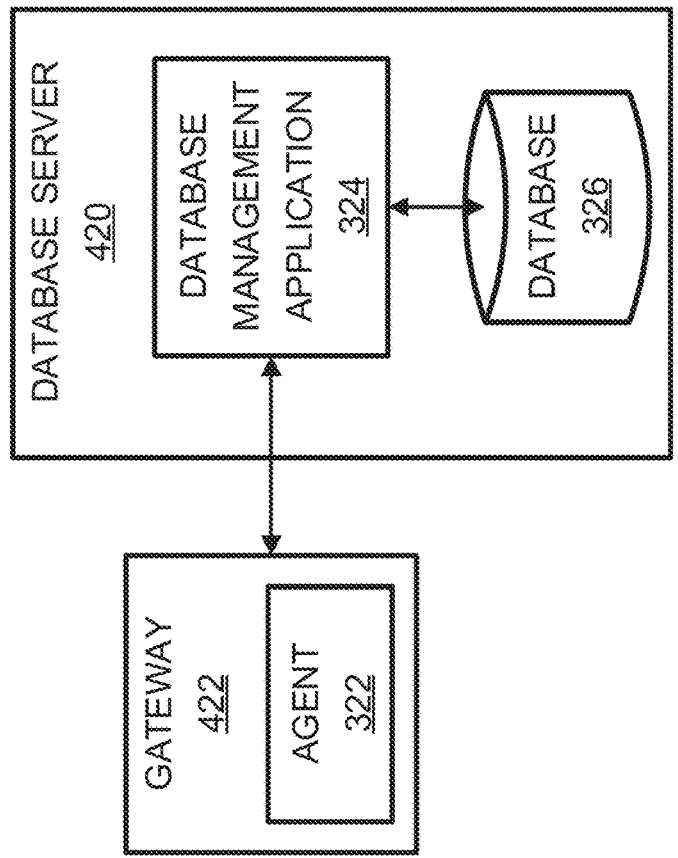
FIG. 4B depicts a data source machine that includes a combination of a gateway, a network gate or a proxy and a database server, according to embodiments of the invention.
Figure 4A:
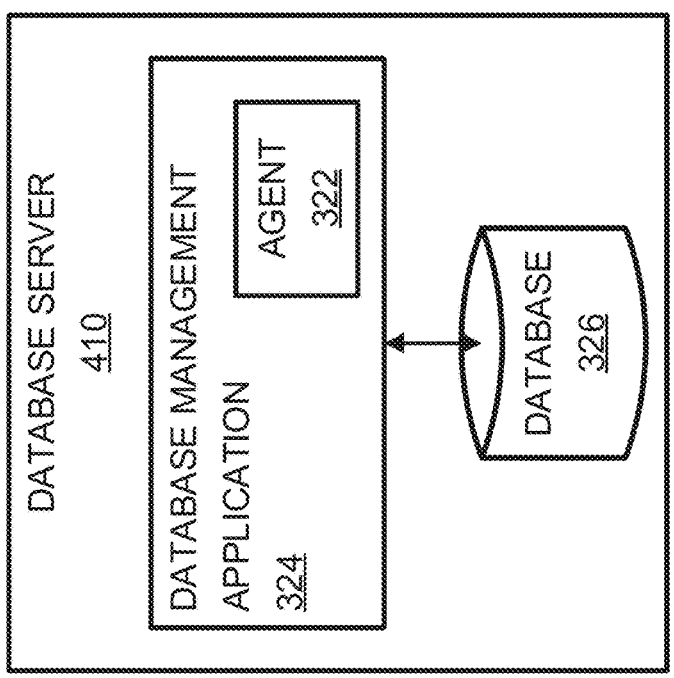
FIG. 4A depicts an example of a data source machine that includes a database server, according to embodiments of the invention.

Data source machine 320 may include a database 326, (e.g., a database server or a relational database, a file server, etc.), or a combination of a database 326 and a proxy or network gate of database 326, a database management application 324, and an agent application 322. An example of a data source machine that includes a database server 410 is depicted in FIG. 4A. Database server 410 may include database 326 managed by database management application 324, that may include or may communicate with an agent application 322. Similar architecture may apply to a file server. FIG. 4B depicts a data source machine that includes a combination of a gateway, a network gate or a proxy 422 and a database server (or file server) 420. Database server 420 may include a database 326 managed by database management application 324. In this embodiment, an agent application 322 is located at gateway, network gate or proxy 422.

In one example, in response to data access command 356 from database client 310, database management application 324 may handle data access command 356 and generate response 358 for data access command 356 that is returned to database client 310 in a database server response 358.

Data packet 350 may be streamed between database client 310 and data source machine 320. Agent 322 may be a computer-executed process that may capture, sniff or intercept one or more data packets 350 along the communication stream between database client 310 and data source machine 320, without interfering with the communication of data packets 350 to data source machine 320. Agent 322 may be implemented at one or more points along the communication stream between database client application 312 and data source machine 320 to monitor for and capture or intercept data packets 350 without requiring the participation of the database management application 432 (or database software 68), and without relying on any form of native auditing or native logs of the database management application 324. While shown as part of data source machine 320, agent 322 may intercept data packets 350 at other locations such as, but not limited to, the database memory of database server 410 and 420, within network 340, at the operating system level, or at the level of database libraries.

According to embodiments of the invention, agent 322 may capture or intercept a plurality of data packets 350 flowing between data source machine 320 and data client 310. Agent 322 may capture both data access command 356 packets transmitted from data source machine 320 to data client 310 and response 358 packets transmitted from data client 310 to data source machine 320. Data packets 350 may be captured in real-time substantially without adding latency or delay. According to some embodiments, agent 322 may decrypt captured data packets 350 to obtain header 352 of each data packet 350. Agent 322 may analyze headers 352 to determine security status of data packet 350 associated with headers 352. For example, agent 322 may decrypt header 352 to obtain header information, including, for example, machine information, network information, user information, client information, etc. Agent 322 may apply header security rules on the header data to obtain a security status of data packet 350. Agent 322 may determine based on the security status whether data packet 350 associated with header 352 should be blocked, should be allowed to flow without further analysis or whether further security analysis is required. For example, a header security rule may define that data packets 350 from a certain user should be blocked if a user is known as a malicious entity, should be allowed to flow without further analysis if the user is trusted, or should be further analyzed if the status of the user is not known. Other header security rules or a combination of header security rules may be used. Since the header structure is known, decrypting and analyzing the header may be performed in real-time without introducing significant delay.

According to embodiments of the invention, agent 322 may send a copy of data packet 350 (e.g., as a mirror and send process) to security server 330 for a comprehensive security analysis.

Security server 330, also referred to as a collector, may implement a data security application 332. Data security application 332 may be or may include a firewall, a DAM and/or a FAM, an external database non-intrusive security mechanism (EDSM), enterprise database auditing, and real-time protection. Data security application 332 may provide a database activity monitoring service of data source machine 320, including performing the comprehensive security analysis. Data security application 332 may provide continuous monitoring of database activity of data source machine 320. Examples of data security application 332 may include, but are not limited to, the Guardium® application available from International Business Machines Corporation.

According to embodiments of the invention, data security application 332 may obtain data packet 350 from agent 322. The comprehensive security analysis may include parsing data access command 356 included in the data packet 350 to extract a template, metadata and data of the data access command, mapping metadata to data, building hierarchy of the data (e.g., building a hierarchical-tree of name-value), and processing policy rules. Processing policy rules may require associated names and values. If there is a rule match, then it may be determined or assumed that the data pertains to a specific data category or a specific type of sensitive data. For example, a rule may include "if name like % ID % and value match specific regular expression (Regex)" then data is tagged as pertaining to a specific category of sensitive data, or a rule identifying sensitive data may expect a zip code plus street name.

According to some embodiments, data security application 332 may extract a data access command 356 or response 358 from the intercepted data packets 350, parse the extracted data access command 356 or response 358 to extract a template, metadata and data of the data access command and create a security construct according to database protocol rules. The database protocol rules may include, but are not limited to, a type of operation or template identified in data access command 356, a database object to be operated on by the operation, and a user identifier of the user requesting the query, identifiers for a service IP address, a client IP address, a client media access control (MAC), a network protocol used to access data, a database type, a service name for the name of a service providing data, a name of a database accessed, a source application used for the data access, an application user name, and operating system user, a database related field, an error code, an exception type, a service IP address of the location of data accessed, and additional or alternate rules.

According to some embodiments, data security application 332 may validate a possible database object access violation in the security construct against security policies defined by the policy rules. In one example, if the security construct does not validate against the security policies, e.g., if the security construct violates the policy rules, data security application 332 may issue an alert to an administrator or other entity indicating that the intercepted data packet 350 has failed to validate against the security rules. In one example, an administrator or service may set each of the rules. According to some embodiments, the security rules may include one or more settings such as, but not limited to, an operation type setting specifying the type of operation access is or is not allowed for, an object setting specifying one or more particular database objects being acted upon by the operation, and a user setting specifying one or more user identifiers for users requesting the operation on the database object. For example, operations that may be restricted by the security rules may include operations such as, but not limited to, create, select, update and delete. The security settings may include additional or alternate types of settings.

According to some embodiments, the security policies and policy rules that are used or applied depend on or the type of data being monitored. For example, special security policies and policy rules may be required for monitoring sensitive data, some of the data in database 326, e.g., some of the tables, or some columns within the tables may be defined, identified, or marked as including sensitive data. Security policies and policy rules applicable to data access commands 356 and responses 358 related to the sensitive data may be specifically designed and adjusted to protect sensitive data. For example, policy rules associated with sensitive data may limit access to the sensitive data to specific users or may limit the operations performed on the sensitive data.

According to some embodiments, database client application 312 may send data access commands 356 to database management application 324, requesting to copy sensitive data 327 from database 326 to another location, e.g., to table 328. In prior art applications, once data access commands 356 is allowed and the sensitive data 327 is copied to table 328, table 328 is not protected by the same policy rules applied sensitive data 327. Prior art systems may not identify that table 328 includes a copy of sensitive data 328 and therefore may not identify table 328 as containing sensitive data. This may enable security breach since data from table 328 (e.g., a copy of sensitive data 327) may be copied outside of data source machine to undesired location, e.g., to file 316.

According to embodiments of the invention, data access commands 356 and responses 358 may be monitored to identify movements of sensitive data 327, and the same security rules applied to the sensitive data 327, may be applied to the copy of the sensitive data 328, thus improving the protection of sensitive data in data source machine 320 and eliminating the security beach.

Each of database client 310, security server 330 and data server 420 may be or may include a computing device such as computing device 700 depicted in FIG. 7. One or more databases 326 may be or may include a storage device such as storage device 730.

Figure 5:
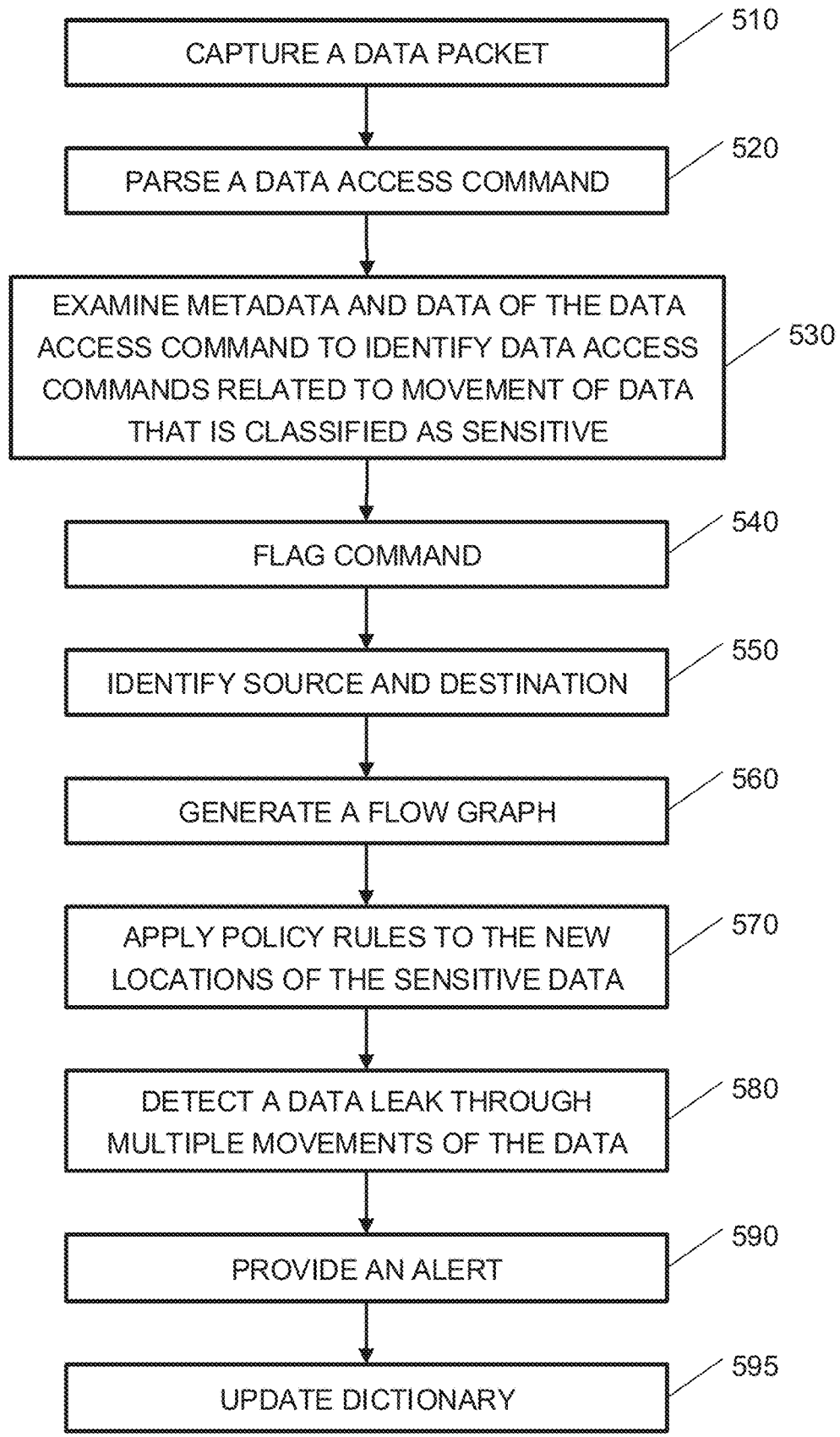
FIG. 5 is a flowchart of a method for classifying data in real-time for data streaming, according to embodiments of the invention.

Reference is made to FIG. 5, which is a flowchart of a method for monitoring of movement of data in a computer network, according to embodiments of the invention. An embodiment of a method for monitoring of movement of data may be performed, for example, by the systems shown in FIGS. 1, 2, 3, 4 and 7. The method for monitoring of movement of data may be repeated for a plurality of data packets (e.g., data packets 350) flowing between a data source machine (e.g., data source machine 320) and a data client (e.g., data client 310).

In operation 510, the system may capture a data packet (e.g., data packet 350). The data packet may include a header (e.g., header 352) and a message (e.g., message 354). The message may include a data access command, e.g., data access command 356, a query or other command sent to a data source machine by a data client or a response (e.g., response 358) of the data source machine to the data access command. For example, an agent software module or instance (e.g., agent 322) located at the data source machine (the data base server or a proxy or network gate of the database server) may capture the data packet and send to data security application 332. In operation 520, the system (e.g., data security application 332) may parse the message sent to or from the data source machine to extract a template, metadata and data of the message. Parsing may include creating a security construct according to database protocol rules, thus providing a structural representation of the message.

In operation 530, the system (e.g., data security application 332) may examine the template, metadata and data of the message to identify data access commands related to movement of data that is classified as sensitive. According to some embodiments, identifying data access commands related to movement of data may include identifying in the data access command a template e.g., the command itself or the specific SQL statement, that is associated with movement of data, e.g., create table, insert select, dump to file etc., and identifying in the data access command data or metadata that is associated with sensitive data. According to some embodiments, identifying responses related to movement of sensitive data may include identifying data or metadata that is associated with sensitive data in the response.

Thus, if the data access command or the response to the data access command includes metadata and data, the metadata and data may be analyzed to identify sensitive data. For example, in some data access commands 356 or responses 358, the metadata may indicate sensitivity, e.g., the metadata may include a column-name that is associated with sensitive data such as "*SALARY*" (metadata may be searched for terms associated with sensitive data as disclosed hereinbelow). In some data access commands 356 or responses 358, the data value may match a pattern of sensitive data, e.g., patterns of social security numbers (SSN), credit card number, etc. Thus, sensitivity may be inferred from properties of the data. In some data access commands 356 or responses 358, an association to sensitive data may be determined by both metadata and data, to improve confidence. For example, the metadata may give a clue forward sensitivity and the data pattern may match or not match a category of sensitive data.

According to some embodiments, templates associated with movement of data may be identified using a dictionary search. A dictionary search may include searching the data access command for search terms including, for example, tokens, values, expressions, words or phrases associated with templates related to movement of data such as create table, insert select, dump to file etc. Additionally or alternatively, templates may be identified using fuzzy-search, regular expression (regex) search, natural language processing (NLP), wildcard search, and other correlation algorithms.

According to some embodiments, identifying data or metadata that is associated with sensitive data, e.g., classifying data as sensitive, in message 354 may include checking if message 354 includes known types or categories of sensitive data, such as car-license-number, salary, age, zipcode, SSN, personal name, address, telephone number, etc. Identifying data or metadata that is associated with a type or category of sensitive data may include a series of tests tailored for that type or category of sensitive data. Identifying a type or category of sensitive data may be relatively simple for some types of sensitive data or more complex for other types. For example, SSN or credit card numbers may be identified by executing a regular expression (regex) search to identify the specific pattern of the SSN or credit card number. However, identifying car license or street name, where there is no unique pattern, may be more difficult. According to some embodiments, analyzing or classifying data and metadata of messages 354 to identify sensitive data may include:

Wildcard search, e.g., searching for specified search terms such as tokens, phrases, expressions or words with any value right before or after the search terms, as indicated by the wildcard e.g., *EMP_SAL *, *salary*, etc. where a wildcard indicates 'any value'. For example, to capture data access commands 356 or responses 358 that are related to salaries, a wildcard search of *EMP_SAL*, *salary*, *salaries*, *payslip*, *pay*, *reward*, *wage* and any other related term may be performed.

Regular expression (regex) search also referred to as pattern match, e.g., using a sequence of characters that define a search pattern for finding a pattern of data or a certain amount of text in the data access command.

Dictionary search, e.g., keeping, storing or maintaining templates, data and metadata associated with sensitive data, such as specific personal names, street names, etc. in a dictionary. The templates, data and metadata in the dictionary may be saved explicitly or hashed. Thus, examining the template, metadata and data of the message may include matching the templates, data and metadata in the message (or a hashed form of the templates, data and metadata) to the templates, data and metadata that are stored in the dictionary.

Rule match search—Data analysis may include identifying a data types or category of a given data item or value by checking if the data item obeys a mathematic rule associated with the data category.

Fuzzy-search, also referred to as approximate string matching, e.g., various techniques used for finding strings that approximately match a pattern.

Natural language processing (NLP)—NLP tools may be used to identify different variations related to a subject. For example, metadata that relates to payments may include many variations on the subject, e.g., salary, salaries, pay, salary slip, payment, wage, stipend, reward, etc. NLP tools may identify all or at least many of those variations. Thus, NLP tools may help to identify that all are related to payment and all might be identified as sensitive.

In some embodiments, if the analysis provides positive results then the data access command may be identified or flagged as moving sensitive data, as indicated in operation 540. In some embodiments, each search may provide a grade or a score indicative of the chance or probability that the message 354 includes a data movement command of a sensitive data. The scores or grades may be combined to obtain a total score. If the total score exceeds the threshold then the message may be identified or flagged as moving sensitive data. Otherwise the message may be identified or flagged as not moving sensitive data. Combining the scores or grades may include applying mathematical and/or logical operations on the scores or grades. For example, the scores or grades may be summed to obtain the total score or grade. According to some embodiments, first a template of a data movement command may be identified as disclosed herein. Then, if the data moved by the data movement command is determined or identified by any of the data and metadata searches disclosed herein or according to a combined grade of the data and metadata searches to be sensitive, the command may be flagged as moving sensitive data.

In operation 550, the system (e.g., data security application 332) may identify the source and destination or target of the data movement command from the metadata. Thus, the source and destination of data movement commands such as create table like, insert select, dump to file etc. may be identified. According to some embodiments, the templates including the syntax of the possible data movement commands (e.g., for the specific type of data source machine) may be known. Thus, once such a command is identified, e.g., in operation 530, the source and what the destination may be identified based on the known syntax of the data access command e.g., according to the expected location of the source and destination in the data access command relatively to the template. For example, in the data access command presented hereinbelow in Example 1, "create table" and "SELECT * from" are the template, and the table 'UNDER_THE_RADAR' may be identified as the source based on its location relatively to "create table" in the data access command, and the table 'SENSITIVE_TABLE' may be identified as the destination based on its location relatively to "SELECT * from". The source and destination may be identified from the metadata based on the relative location of the source and destination to the data access command and a-priory knowledge of the template.

In operation 560, a flow graph, also referred to as an association graph, indicative of new locations of the sensitive data may be generated based on the identified data movement commands, the source and the destination. For example, if the data movement command includes a command to move data from a source location to a destination location (e.g., copy data to the destination with or without deleting the data from the source location), the flow graph may include an indication that the data specified in the command has moved from the source location to the destination location. Thus, the new location (e.g., table, repository or object) may be the destination location, e.g., a different table repository or object in the same or different database or a file. In some embodiments, association and correlation mining algorithms may be used to organize the flow graph, e.g., to detect and remove duplications and overlaps.

FIG. 6A presents an example of movement of sensitive data. A first database 610 includes a salary table 612 named "SALARY". Data from salary table 612 is copied using a data movement command to a second table 622 named "TABLE2" in a second database 620. "TABLE2" is copied using a data movement command to a third table 632 named "TABLE3" in a third database 630. Salary table 612 is copied using a data movement command to a fourth table 642 named "TABLE4" in a fourth database 640. Fourth table 642 is copied using a data movement command to a file 650 called "FILE5". FIG. 6B presents a flow graph or an association graph 600, according to embodiments of the invention, showing the relation between the tables and files in FIG. 6A. Thus, association graph 600 presents the relation between salary table 612, second table 622, third table 632, fourth table 642 and file 650. It should be readily understood that other representations may be used to describe a flow graph, such as a tabular of other representation.

In operation 570, the system (e.g., agent 332 and data security application 332) may generate and apply security rules or policies to the new locations of the sensitive data to monitor access to the new location. Thus, for example, all packets sent to and from the new location may be captured and the same security rules or policies that were defined for the original location of the data, may apply to the new location of the data. For example, if data access commands sent to the original location were monitored, data access commands sent to the copied or moved data will be monitored as well, and the same policy rules will apply, protecting the sensitive data in the new location.

In operation 580, the system (e.g., data security application 332) may detect a data leak through multiple movements of the data. For example, the system may detect a data leak through multiple movements of the data using the flow graph. For example, a data leak may be detected if sensitive data is transferred to an external Internet protocol (IP), to a suspicious IP (e.g., to an IP that is known as suspicious), to an external network, to an external disk, to an or abnormal or new destination, etc. The flow graph may enable detecting data leak through multiple steps, for example, the flow graph may indicate that sensitive data was copied to a temporary table, from the temporary file to a staging database (e.g., an intermediate storage area), from the staging database to new database, and eventually written to a file. In operation 590, the system may issue an alert in case a possible a data leak has been detected.

Thus, embodiments of the invention may provide dynamic monitoring of movement of data in a computer network, that is based on the content of actual data access commands sent to the database and responses provided by the database. Thus, embodiments of the invention may learn new locations of sensitive data from the real traffic to and from the database, without requiring human assistance and configuration. Thus, embodiments of the invention may apply appropriate security policies to new locations of sensitive data dynamically and automatically, without requiring a human operator to configure the security policy and rules for the new location of the sensitive data. Therefore, according to embodiments of the invention, and in contrary to prior art systems, when sensitive data is copied or moved from monitored repositories or objects new repositories, the copied data is marked as sensitive in the new location, and the measures that are normally taken to protect sensitive data are performed in the same manner as for the original data. Thus, the sensitive data is protected in the new location, and leakage of sensitive data out of the organization may be prevented.

In operation 595, the dictionary used in operation 530 may be updated based on the search results. The dictionary terms may include data, metadata and templates found in data access commands. For example, in case a metadata value (e.g., a column header) was found as related to sensitive data using for example, a fuzzy search or regex, the metadata value may be added to the dictionary for future use. According to some embodiments, the dictionary may include hashed values. According to some embodiments, the dictionary terms may be ordered by frequency of identification of the terms previously found in messages related to movement of data that is classified as sensitive, e.g., the frequency of matches to the term in the messages. For example, the least frequent and the most frequent terms may get higher priority comparing with middle range frequent terms. According to some embodiments, each term may be associated with an importance level, a grade or a score indicative of the priority of identification. Templates, data and metadata with importance level below a threshold may be removed from the dictionary. Thus, in operation 530, terms with importance level above a threshold may be used for the dictionary search.

Following are examples for commands that may be detected using embodiments of the method dynamic monitoring of movement of data in a computer network:

Example 1

1. A data access command "create table UNDER_THE_RADAR as SELECT * from SENSITIVE_TABLE" is executed.
2. The data access command is captured (operation 510).
3. The data access command is parsed (operation 520).
4. The command "create table" is analyzed and identified as moving sensitive data (operations 530-540).
5. SENSITIVE_TABLE is identified as the source and UNDER_THE_RADAR as the destination. Thus, UNDER_THE_RADAR is identified as connected or associated with SENSITIVE_TABLE (operation 560).
6. UNDER_THE_RADAR is added to the same sensitive objects group as SENSITIVE_TABLE and is protected with same policy as SENSITIVE_TABLE (operation 570).

Example 2

1. Following step 6 of Example 1, a data access command "SELECT * FROM UNDER_THE_RADAR INTO OUTFILE '/tmp/orders.txt'" is executed.
2. The data access command is captured (operation 510).
3. The data access command is parsed (operation 520).
4. The command "SELECT INTO OUTFILE" is analyzed and identified as moving sensitive data (operations 530-540).
5. UNDER_THE_RADAR is identified as the source and the file "'/tmp/orders.txt'" as the destination. Thus, "'/tmp/orders.txt'" is identified as connected or associated with of UNDER_THE_RADAR, which was previously identified as connected or associated with of SENSITIVE_TABLE, (operation 560).
6. A flow graph is generated describing the relation between "'/tmp/orders.txt'", UNDER_THE_RADAR and SENSITIVE_TABLE.
7. An alert is provided notifying the security officer of a possible breach (operation 590).

Example 3

1. The data access command "insert into table MY_TABLE (a,b) values ("4580*************", "John Doe"): is executed.
2. The data access command is captured (operation 510).
3. The data access command is parsed (operation 520).
4. The number "4580***********" is identified as a credit card number (e.g., since the number obeys to mathematic rules associated with credit card numbers, operation 530**).
5. The data access command is flagged as moving sensitive data (operation 540).
6. MY_TABLE is identified as the destination (operation 560).
7. MY_TABLE is added to the same sensitive objects group as the original credit card number and is protected with same policy as the original credit card number (operation 570).

Figure 6:
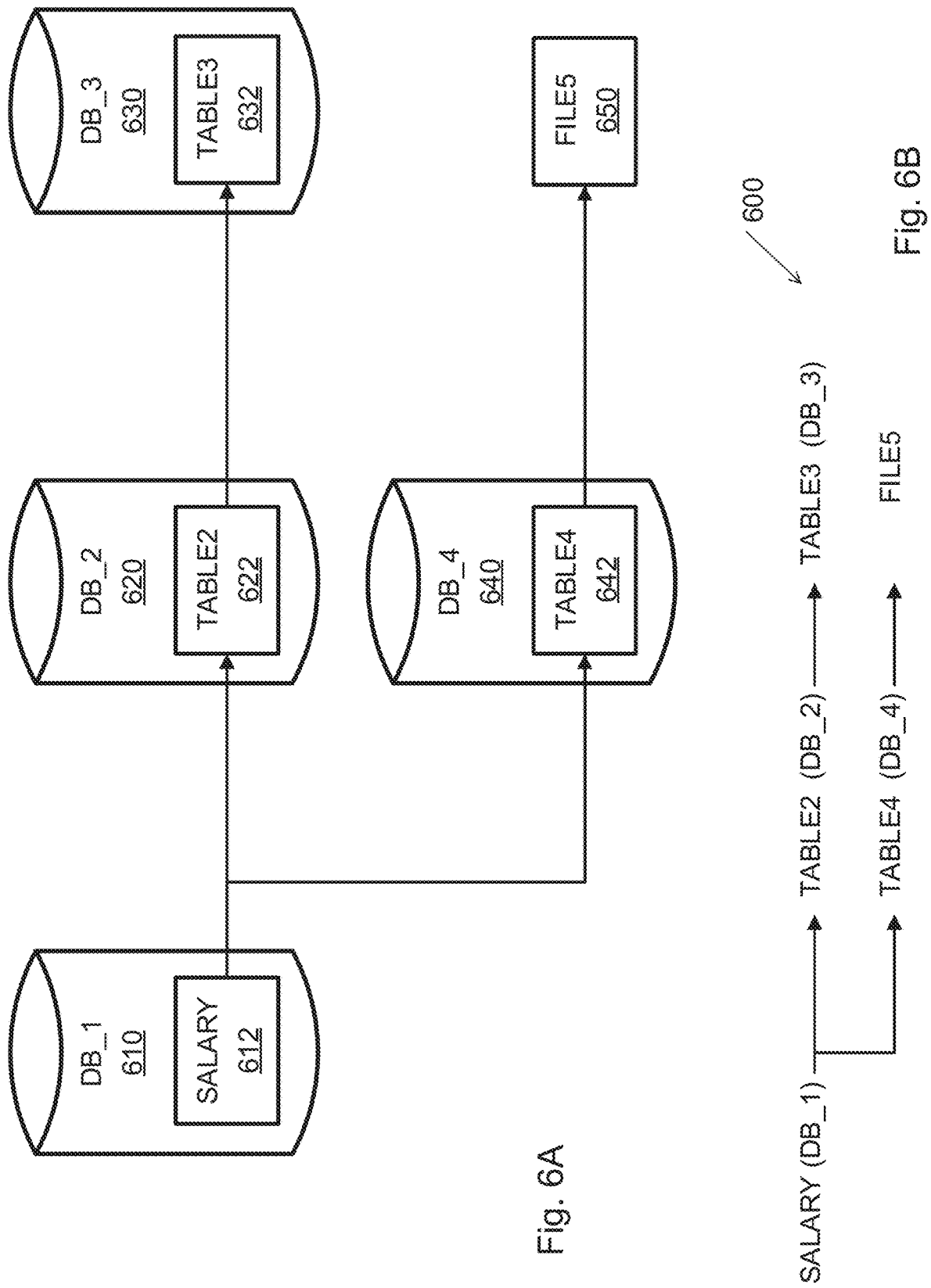
FIG. 6A presents an example of movement of sensitive data, helpful in demonstrating embodiments of the invention.
FIG. 6B presents a flow graph or an association graph, according to embodiments of the invention.

FIG. 6 illustrates an example computing device according to an embodiment of the invention. Various components such as database client 310, security server 330 database servers 410 and 420, gateway or proxy 422 and other modules, may be or include computing device 700, or may include components such as shown in FIG. 5. For example, a first computing device 700 with a first processor 705 may be used to dynamically monitor of movement of data in a computer network, according to embodiments of the invention.

Computing device 700 may include a processor 705 that may be, for example, a central processing unit processor (CPU), a chip or any suitable computing or computational device, an operating system 715, a memory 720, a storage 730, input devices 735 and output devices 740. Processor 705 may be or include one or more processors, etc., co-located or distributed. Computing device 700 may be for example a workstation or personal computer, or may be at least partially implemented by one or more remote servers (e.g., in the "cloud"). For example, computing device 700 may be included in cloud computing environment 50 depicted in FIGS. 1, 2, 3 and 4.

Operating system 715 may be or may include any code segment designed and/or configured to perform tasks involving coordination, scheduling, arbitration, supervising, controlling or otherwise managing operation of computing device 700, for example. Operating system 715 may be a commercial operating system. Operating system 715 may be or may include any code segment designed and/or configured to provide a virtual machine, e.g., an emulation of a computer system. Memory 720 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 720 may be or may include a plurality of, possibly different memory units.

Executable code 725 may be any executable code, e.g., an application, a program, a process, task or script. Executable code 725 may be executed by processor 705 possibly under control of operating system 715. For example, executable code 725 may be or include software for dynamically monitoring of movement of data in a computer network, according to embodiments of the invention. In some embodiments, more than one computing device 700 may be used. For example, a plurality of computing devices that include components similar to those included in computing device 700 may be connected to a network and used as a system.

Storage 730 may be or may include, for example, a hard disk drive, a floppy disk drive, a Compact Disk (CD) drive, a CD-Recordable (CD-R) drive, a universal serial bus (USB) device or other suitable removable and/or fixed storage unit. Storage 730 may include or may store one or more databases including database 326, In some embodiments, some of the components shown in FIG. 6 may be omitted. For example, memory 720 may be a non-volatile memory having the storage capacity of storage 730. Accordingly, although shown as a separate component, storage 730 may be embedded or included in memory 720.

Input devices 735 may be or may include a mouse, a keyboard, a touch screen or pad or any suitable input device. It will be recognized that any suitable number of input devices may be operatively connected to computing device 700 as shown by block 735. Output devices 740 may include one or more displays, speakers and/or any other suitable output devices. It will be recognized that any suitable number of output devices may be operatively connected to computing device 700 as shown by block 740. Any applicable input/output (I/O) devices may be connected to computing device 700 as shown by blocks 735 and 740. For example, a wired or wireless network interface card (NIC), a modem, printer or facsimile machine, a universal serial bus (USB) device or external hard drive may be included in input devices 735 and/or output devices 740. Network interface 750 may enable device 700 to communicate with one or more other computers or networks. For example, network interface 750 may include a Wi-Fi or Bluetooth device or connection, a connection to an intranet or the internet, an antenna etc.

Embodiments described in this disclosure may include the use of a special purpose or general-purpose computer including various computer hardware or software modules, as discussed in greater detail below.

Embodiments within the scope of this disclosure also include computer-readable media, or non-transitory computer storage medium, for carrying or having computer-executable instructions or data structures stored thereon. The instructions when executed may cause the processor to carry out embodiments of the invention. Such computer-readable media, or computer storage medium, can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general-purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computer" may be any computing system as previously defined herein, or any module or combination of modulates running on a computing system.

For the processes and/or methods disclosed, the functions performed in the processes and methods may be implemented in differing order as may be indicated by context. Furthermore, the outlined steps and operations are only provided as examples, and some of the steps and operations may be optional, combined into fewer steps and operations, or expanded into additional steps and operations.

The present disclosure is not to be limited in terms of the particular embodiments described in this application, which are intended as illustrations of various aspects. Many modifications and variations can be made without departing from its scope. Functionally equivalent methods and apparatuses within the scope of the disclosure, in addition to those enumerated, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used in this disclosure is for the purpose of describing particular embodiments only, and is not intended to be limiting.

This disclosure may sometimes illustrate different components contained within, or connected with, different other components. Such depicted architectures are merely exemplary, and many other architectures can be implemented which achieve the same or similar functionality.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

The invention claimed is:

1. A method for monitoring of movement of data in a computer network, the method comprising:
   maintaining a dictionary of data, metadata and templates associated with sensitive data;
   ordering the dictionary by frequency of identification of terms in the messages related to movement of data that is classified as sensitive;
   associating an importance level to each item in the dictionary, wherein the importance level is inversely related to the frequency of identification;
   removing from the dictionary templates, data and metadata with importance level below a threshold;
   parsing a message, the message including one of a data access command sent to a computer database and a response to a data access command, to extract at least one of a template, metadata and data of the message;
   examining at least one of the template, metadata and data of the to identify messages related to movement of data that is classified as sensitive message by matching the templates, data and metadata in the message to the templates, data and metadata in the dictionary; and
   generating a flow graph indicative of new locations of the sensitive data.

2. The method of claim 1, comprising:
   applying policy rules to the new locations of the sensitive data to monitor access to the new location.

3. The method of claim 1, comprising:
   using the flow graph to detect a data leak through multiple movements of the data.

4. The method of claim 1, wherein examining the metadata comprises identifying a source and a target for the movement of the data, wherein the target is the new location of the sensitive data.

5. The method of claim 1, wherein examining the data and metadata comprises:
   checking if the message includes known types or categories of sensitive data.

6. The method of claim 1, wherein examining the template, data and metadata comprises performing one or more of: wildcard search, regular expression search, dictionary search, rule match search, fuzzy search, and natural language processing.

7. The method of claim 1, wherein examining the data access command comprises identifying in the data access command a template that is associated with movement of data, and identifying in the data access command data or metadata that is associated with sensitive data.

8. A system for monitoring of movement of data in a computer network, the system comprising:
   a memory; and
   a processor configured to:
      maintain a dictionary of data, metadata and templates associated with sensitive data;
      order the dictionary by frequency of identification of terms in the messages related to movement of data that is classified as sensitive;
      associate an importance level to each item in the dictionary, wherein the importance level is inversely related to the frequency of identification; and
      remove from the dictionary templates, data and metadata with importance level below a threshold;
      parse a message, the message including one of a data access command sent to a computer database and a response to a data access command, to extract at least one of a template, metadata and data of the data access command;
      examine at least one of the template, metadata and data of the message to identify messages related to movement of data that is classified as sensitive by matching the templates, data and metadata in the message to the templates, data and metadata in the dictionary; and generate a flow graph indicative of new locations of the sensitive data.

9. The system of claim 8, wherein the processor is configured to:
apply policy rules to the new locations of the sensitive data to monitor access to the new location.

10. The system of claim 8, wherein the processor is configured to:
use the flow graph to detect a data leak through multiple movements of the data.

11. The system of claim 8, wherein the processor is configured to examine the metadata by identifying a source and a target for the movement of the data, wherein the target is the new location of the sensitive data.

12. The system of claim 8, wherein the processor is configured to examine the data and metadata by checking if the message includes known types or categories of sensitive data.

13. The system of claim 12, wherein the processor is configured to examine the template, data and metadata by performing one or more of: wildcard search, regular expression search, dictionary search, rule match search, fuzzy search, and natural language processing.

14. The system of claim 8, wherein the processor is configured to examine the data access command by identifying in the data access command a template that is associated with movement of data, and identifying in the data access command data or metadata that is associated with sensitive data.

15. A method for monitoring movement of data in a computer database, the method comprising:
maintaining a dictionary of data, metadata and templates associated with sensitive data;
ordering the dictionary by frequency of identification of terms in the messages related to movement of data that is classified as sensitive;
associating an importance level to each item in the dictionary, wherein the importance level is inversely related to the frequency of identification;
removing from the dictionary templates, data and metadata with importance level below a threshold;
parsing data access commands sent to the computer database and responses to a data access commands, to extract a template, metadata and data of the data access commands;
examining the template, metadata and data to identify data access commands and responses related to movement of sensitive data by matching the templates, data and metadata in the data access commands to the templates, data and metadata in the dictionary; and
applying policy rules to the new locations of the sensitive data to monitor access to the new location.

16. The method of claim 15, comprising:
generating a flow graph indicative of new locations of the sensitive data.

* * * * *